Feb. 2, 1965     T. M. HOLLAND     3,167,832
CLAMP-TYPE RIMMED CAN HOLDER

Filed Sept. 13, 1962     2 Sheets-Sheet 1

INVENTOR.
THERON M. HOLLAND
BY
*Anderson, Spangler & Wymore*
ATTORNEYS

INVENTOR.
THERON M. HOLLAND
BY
ATTORNEYS

3,167,832
CLAMP-TYPE RIMMED CAN HOLDER
Theron M. Holland, 390 Colorado Blvd., Denver, Colo.
Filed Sept. 13, 1962, Ser. No. 223,420
8 Claims. (Cl. 24—81)

This invention relates to devices for holding two or more rimmed cans in assembled relation and, more specifically, to a device of the type aforementioned that is characterized by the inclusion of a rotatable cam element that is operative upon actuation to either release or fasten said cans together.

In my co-pending application for Letters Patent of the United States Serial Number 150,343 filed November 6, 1961 and now abandoned, I disclose a clip-type device for the same purpose, namely, to releasably hold two or more rimmed cans together in assembled relation as a substitute for the conventional pasteboard carton that is commonly used. This clip-type unit, while entirely satisfactory for certain applications, does possess certain limitations which are overcome by the cam-operated unit of the instant application. For example, the clip version is not well-suited to large liquid-filled cans of half-quart size and larger because the stresses applied to the rim-engaging elements thereof are so great as to make premature release possible. Secondly, the clip-type unit is better suited to plastic molding techniques and cannot be manufactured economically as a stamped metal element. Of greater significance, however, is the fact that the plastic clip does not lend itself as well as the cam-actuated unit of the present invention to high-speed packaging machinery for use in fastening same to the cans.

Other limitations are the somewhat less secure hold of the clip on the can rim which makes it subject to accidental release during rough handling and shipment. Also, unless a high grade plastic is used in fabrication of the clip, refrigeration can render it brittle and easily broken. Furthermore, the clips, due to their greater bulk, cause some problems in stacking especially in shelf displays and the like.

The cam-actuated unit, on the other hand, eliminates most, if not all, of the aforementioned problems and thus becomes a more versatile device. For instance, it is capable of supporting the weight of several cans much larger than it is advisable to use with the clip-type unit due to the more positive and secure locking arrangement provided by the cam. It is ideally adapted to manufacture from sheet metal by high-speed stamping techniques although it can be molded from plastic if desired. The unit is extremely well-suited to high speed packaging machinery because the cans need not be tilted or otherwise rearranged while the holder is being applied thereto and locked in place. In fact, it is not even necessary to interrupt the progress of the can line as the holder may be put in place thereon and the cam turned while they are still moving.

The positive locking feature of the cam makes the holder extremely rugged and better able to withstand rough usage than either the clip-type or conventional carton. The cans are so securely held that severe damage thereto will result before the cam will release and allow them to fall out.

The fact that the unit can be made of metal and need not be deformed in any way to accept the cans or release same obviates any difficulties arising from extremes in temperature or breakage arising from abuses inflicted thereon while releasing or replacing the cans. The cam-type units are readily colored to complement the can decorations or labels when made of metal and they offer considerably less bulk which means that they do not interfere with normal stacking on shelves or for warehousing.

Notwithstanding the above advantages, the cam-actuated units are competitive in price with both the clip-type can holders and the paper cartons. They are reuseable over longer periods of time than other packaging media. In addition, they possess the several advantages of the clip-type unit over paper cartons that were outlined in detail in my co-pending application above-identified.

It is, therefore, the principal object of the present invention to provide a novel and improved cam-actuated holder for rimmed cans.

A second object is the provision of a unit of the class described that is extremely versatile in that it is capable of being used with cans of nearly any size and filled weight in common use.

Another object is the provision of a can holder that requires no special tools to actuate the cam mechanism between its released and latched positions.

Still another objective of the invention herein disclosed is to provide a can fastening device that lends itself well to automatic application by machine on high-speed can lines.

An additional object is the provision of a means for holding cans in assembled relation that can be fabricated very economically from sheet metal with ordinary stamping equipment.

Further objects of the invention are to provide a device for fastening cans together that is simple, easy to operate, reuseable, compact, rugged, decorative, light-weight, trouble-free, disposable, inexpensive and which is adaptable for use in a variety of ways to fasten together an assembly of cylindrical rimmed articles.

Other objects will be in part apparent and in part pointed out specifically hereinafter in connection with the description of the drawings that follows, and in which.

Figure 1:
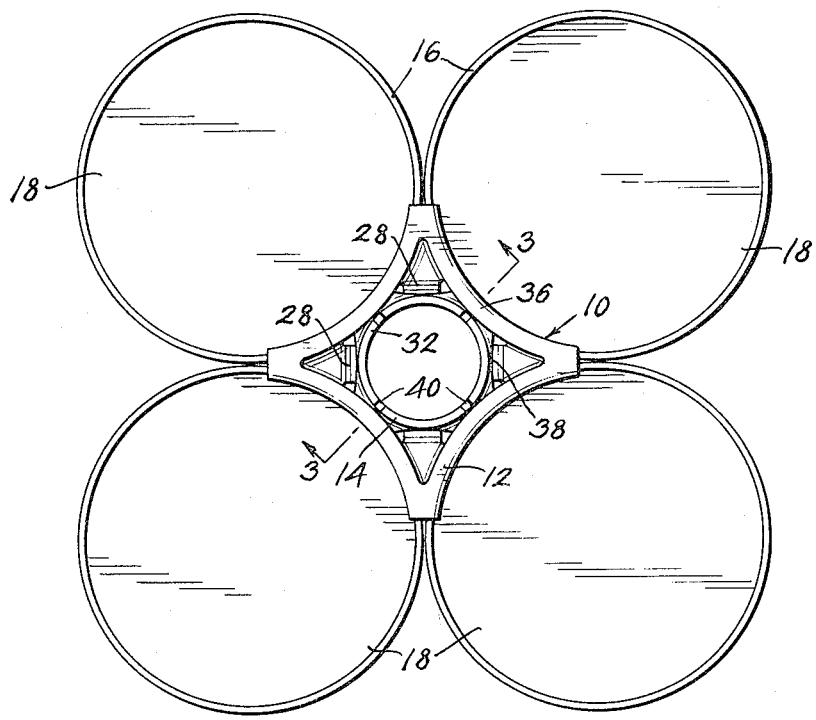
FIGURE 1 is a top plan view showing one of the cam-operated clamps of the present invention secured in place on the rims of four cans holding same in assembled relation.
Figure 8:
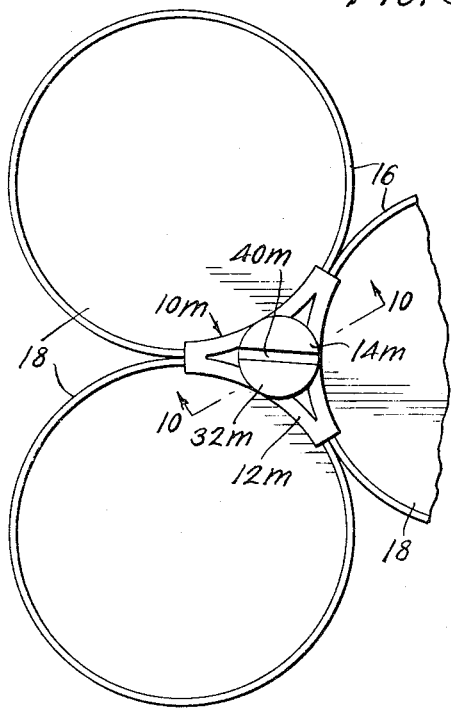
FIGURE 8 is a top plan view similar to FIGURE 1 showing a modified form of the clamp adapted to hold three instead of four rimmed cans.

Referring now to the drawings for a detailed description of the present invention and, initially, to FIGURES 1 through 7, inclusive, for this purpose, it will be seen that the preferred form which has been designated in a general way by reference numeral 10 comprises two parts, namely, a rim-engaging clip 12 and a cam latch 14 that is carried within the clip for limited relative rotation and releasably locks in under the can rim 16 to hold the cans 18 in assembled relation. While the cam-actuated can holder forming the subject matter hereof will hold a single rimmed can, its utility, of course, lies in the ability to lock two or more cans together into a unitary package. Accordingly, from a practical standpoint the can holder must be adapted to hold at least two cans and preferably three or more. The most compact package results when the cans are grouped in side-by-side tangential relation as shown in FIGURES 1 and 8. In the case of three cans, their cylindrical axes lie equally spaced from one another defining the corners of an equilateral triangle assuming, of course, that all three cans are the same diameter which is usually the case although nothing would prevent specialized clamps being made to accommodate cans of different sizes and even other shapes than cylindrical such, as for example, oval and square; however, practically speaking these units would find little application and need not be considered as long as it is understood that the principles outlined herein are equally applicable thereto. Along this same line, the cans need not touch one another or be arranged symmetrically as shown although no useful purpose would be served by arranging them otherwise.

In the case of an even number of cans, the best arrangement is to place them symmetrically on opposite sides of a centerline as exemplified by the four cans grouped this way in FIGURE 1.

Figures 2, 3:
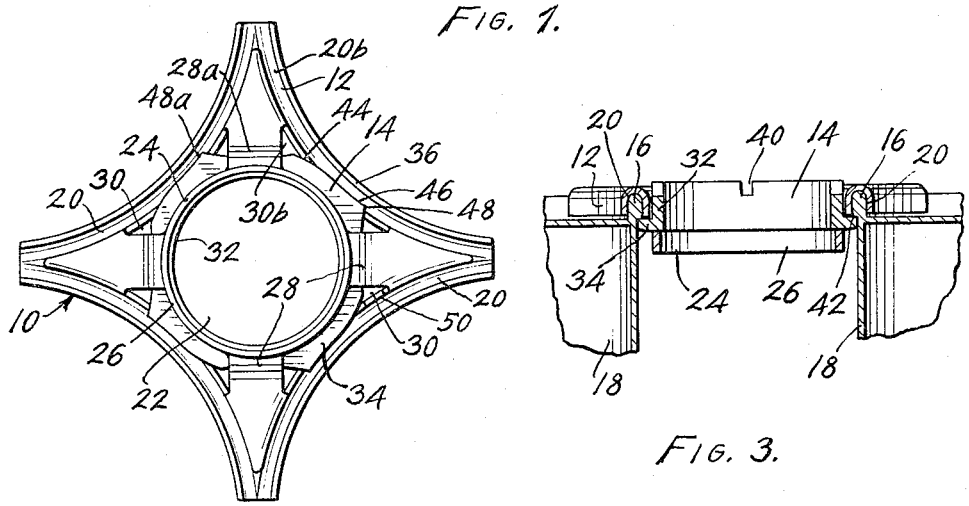
FIGURE 2 is a bottom plan view of the clamp itself slightly enlarged.
FIGURE 3 is a section taken along line 3—3 of FIGURE 1 and slightly enlarged.

The rim-engaging clip element 12 which is best seen in FIGURES 2 and 3 has the underside thereof grooved as at 20 to accept the upstanding portion of the can rim 16. For cylindrical cans of the same diameter, these grooves form segments of a circle having the same radius as the can rim 16. The length of these segments depends to some extent on the number and arrangement of the cans the clip is designed to accommodate. For example, a four can clip preferably has grooves that extend approximately 90° and do not intersect one another, but rather, merge at their points of tangency. Of course, these grooves may have a length substantially less or greater than a quarter-circle; however, the shorter ones provide a less secure hold while a longer groove tends to make the unit to large with no attendant advantages. The three-can clip, on the other hand, has grooves of a length subscribing a circular arc of only 60° corresponding to the angular separation between the points of tangency of the can rims. Here again, the groove length may be shorter or longer than that outlined above and still define an operative structure although no useful result would be achieved by so doing.

The margins of the rim-engaging clip element 12 that contain the rim-receiving grooves preferably have an inverted U-shaped cross-section that can be clearly seen in FIGURE 3 and which are most easily formed in sheet metal with a die-stamping operation. Any metal extending outwardly from these grooves over the top of the can is of no functional significance, therefore, it should either be trimmed off or blanks provided in which such excess metal has been eliminated. The resultant structure would be more or less star-shaped as shown in FIGURES 1, 2, 4, 8 and 9, the number of points corresponding to the maximum number of cans the holder is designed to accept.

When the rim-engaging element 12 of the holder is positioned as shown in FIGURES 1, 3 and 8 down over the can rims 16, it is important to note that, in the absence of the cam latch element 14, the cans are not locked together. In other words, the rim-engaging element by itself does not fasten to the cans, but rather, holds them in proper relation and cooperates with the latch element to lock them in place. As such, the function of the rim-engaging element 12 is somewhat different than that of the clip-type holder that forms the subject matter of my co-pending application previously mentioned. Also, this different function is significant with respect to the operations that must be performed by automatic packaging equipment to place the two different types of can holders on the cans.

In the clip-type unit, it will probably be necessary to tilt the cans in order to move the rims into place within the grooves and above the retaining lugs. In the present instance, on the other hand, the cans need not be tilted as the rim-engaging element can move straight down onto the tops thereof while they lie with their cylindrical axes in spaced parallel relation to one another and the rims in contacting tangential relation. Obviously, this relationship is a simple one to achieve and maintain when compared with the more difficult operation of tilting the cans in several different directions. Also, the cans on most up-to-date high speed can lines already occupy the relationship above-described as they emerge from the final stage because this same type of arrangement is required to place them in cartons or boxes.

Figure 4:
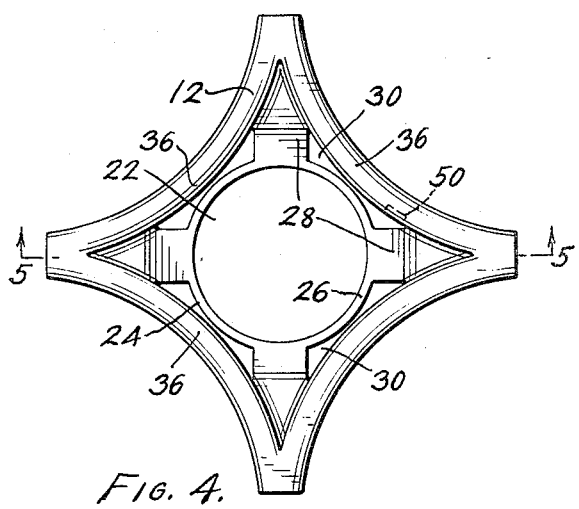
FIGURE 4 is an enlarged top plan view of the unit showing the cam ring removed therefrom.
Figure 5:
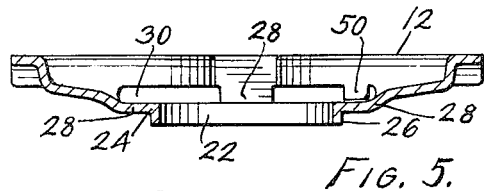
FIGURE 5 is a section taken along line 5—5 of FIGURE 4.
Figure 7:
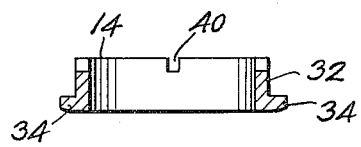
FIGURE 7 is a diametrical section through the cam ring.

FIGURES 2, 4 and 5 most clearly reveal the manner in which the rim-engaging element 12 is blanked out to form the central opening 22 adapted to receive the user's thumb or finger and the framework that provides a support for the cam latch 14. This latch-supporting framework which has been designated in a general way by reference numeral 24 and which is preferably formed integral with the rim-engaging element 12, comprises a ring 26 attached by webs 28 extending from the periphery of the ring at angularly spaced points to the portions of said rim-engaging element where the grooves 20 become tangent to one another. Gaps 30 are, therefore, left between the webs which open onto the cylindrical wall of the can immediately underneath the rim 16 by virtue of the recessed position of the ring 26 that is best revealed in FIGURE 3. The provision of a ring configuration interconnecting the webs rather than a solid member has the advantage of providing the unit with a finger or thumbhold which is most desirable when handling the package.

The cam-latch element 14 of the holder is shown in FIGURES 1 through 3, 6 and 7, the latter figures revealing the latch alone. It comprises a ring 32 having cam-forming lugs 34 projecting outwardly from the base thereof for the purpose of locking in under the overhanging portion of the can rim as seen in FIGURE 3. The ring 32 of the latch element rests and turns upon the underlying ring 26 that comprises part of the supporting network 24 of the rim-engaging element 14. Centered relation of the cam-latch ring with respect to the rim-engaging element is maintained by the grooved margins of the latter at a point 36 intermediate their ends. The cam lugs 34 project through the gaps 30 between the webs 28 and underneath these midsections 36 of the grooved edges where they can engage the cylindrical sidewall of the can immediately underneath the rim. Note in this connection that when the cam-latch element is in the latched position of FIGURE 3, the cam lugs 34 project part way across the rim-receiving groove 20. These cam lugs 34, however, project outwardly an insufficient distance to prevent their dropping into place onto the supporting network 24 when aligned with the webs 28 of the latter. In other words, the cam-latch element 14 occupying the position shown in FIGURE 6 could be moved to the left and dropped into the recessed socket provided in the top of the rim-engaging element above the supporting network 24 of the latter. The holder is assembled in this manner and the portions 38 of the cam-latch element 14 that separate the lugs 34 are made of concave configuration to pass by the corresponding convex sections 36 of the rim-engaging element that contain the rim-receiving grooves 20.

The upper face of the ring portion 32 of the cam-latch element is preferably provided with at least one set, and preferably more than one set, of diametrically positioned notches 40 sized to accept a large coin, the side edge of a punch-type can opener, or other bladed tool that is used to rotate said latch between its locked and released positions. The upper edge of the cam-latch ring 32 projects slightly above the rim-engaging element to provide better access to the notches; however, this in no way interferes with the ease with which one pack of cans can be stacked upon another as the cam-latch ring will fit up into the space left open between the can bottoms. Note also in this same connection that only a single thickness of sheet metal separates one pack of cans from a second pack stacked on top thereof which, of course, is no problem at all. In fact, the circumstance of the cam-latch ring fitting up into the space between the can bottoms of the stacked pack provides an interlock that effectively resists relative horizontal movement therebetween.

Figure 6:
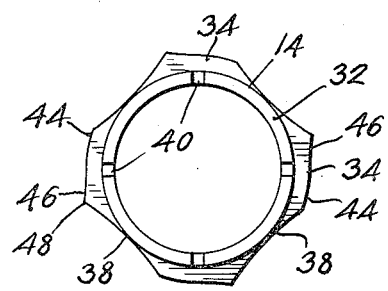
FIGURE 6 is an enlarged top plan view of the cam ring.

Next, the cam lugs which are most clearly shown in FIGURES 2 and 6, will be seen to comprise basically radial webs whose outer edge extends across the rim-receiving groove in the underside of the rim-receiving element a distance equal to the depth of the shoulder 42 (FIGURE 3) existing between the can wall and rim or, in other words, about half way across. The leading edge of the cam surface 44, i.e. that portion of the cam which first moves toward the can when the cam is rotated from released into locked position, is convex and shaped to engage and gradually force the can against the outside of the rim-receiving groove until fully latched. This fully-latched condition is realized when the cam latch has been rotated approximately 45° or one-eighth turn placing the midpoint of the cam surface in tangential relationship to the cylindrical can wall. The trailing edge 46 of the cam surface, on the other hand, is slightly concave in the preferred embodiment and conforms generally to the curvature of the can wall in fully latched position. This has several advantages and constitutes an important feature.

First of all, when fully latched, the trailing edge 46 of the cam surface makes line contact rather than point contact with the can wall producing a more secure hold covering a relatively large area. Secondly, the trailing edge provides a stop which limits the rotation of the cam latch from released into locked position to one-eighth turn as the trailing corner 48 will not pass by the can wall because it begins to extend more than half-way across the rim receiving groove as an attempt is made to turn the cam latch past 45°. This same corner 48 cooperates with a lug 50 (FIGURES 2 and 4) located adjacent one of the rim receiving grooves 20 in the rim-engaging element 12 to provide a limit stop restricting the movement of the cam latch element from locked into released position to approximately one-eighth turn. The latter feature is, however, incidental because in the absence of lug 50, trailing corner 48 would soon contact the cylindrical surface of the can in the adjacent compartment and stop if it were rotated counter-clockwise as viewed in FIGURE 1 a few degrees beyond 45°. In other words, looking at FIGURE 2, it becomes apparent that if the trailing corner 48a in the upper left-hand corner were turned clockwise past web 28a and into the adjacent opening 30b in the upper right-hand corner, it would soon contact the sidewall of the can whose rim was in groove 20b.

Figure 9:
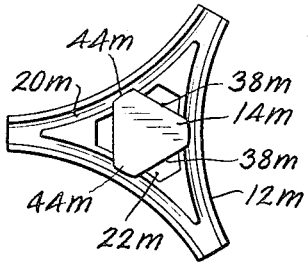
FIGURE 9 is a bottom plan view to an enlarged scale showing the modified clamp of FIGURE 8.
Figure 10:
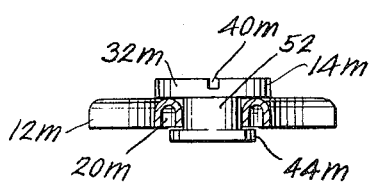
FIGURE 10 is a section taken along line 10—10 of FIGURE 8.

Finally, before proceeding with a detailed description of the three-can modification of FIGURES 8, 9 and 10, it would be desirable to mention briefly some of the materials from which the cam-latch element 14 can be made most easily and economically. As a metal part, it lends itself to both stamping and casting techniques, it being too expensive for the purpose intended as a machined part. Either of the former, however, can be accomplished at a cost well within the limits which would make the entire unit competitive with paper cartons. Ideally, however, the cam-latch would be molded from plastic while the rim-receiving element could best be stamped out of sheet metal.

FIGURES 8, 9 and 10, relate specifically to a three-can embodiment of the holder which has been denominated 10m. The cans, of course, remain unchanged; however, the elements of the holder, the rim-engaging piece 12m and cam latch 14m, are considerably modified to adapt them to the much smaller space available between the cans when located in tangential relation to one another. Basically, the function and operation of both the three and four-can units remains the same and the most significant changes arise in connection with the elimination of some of the refinement in the three-can model because of space limitations.

For instance, the rim-receiving element 12m includes no web-supported network upon which the cam-latch rests, but rather is provided with a central opening 22m in the shape of an equilateral triangle with truncated corners and concave sides curved to follow the contour of the rim-receiving grooves 20m. These grooves are, of course, shorter in angular extent terminating as before at the points of tangency of the can rims. Otherwise, grooves 20m occupy the same structural and functional relationships to one another as in the four-can unit.

It becomes impractical to provide the cam-latch element 14m with a finger-opening in its center as such an opening would be so small as to be of no use. Accordingly, this cam-latch includes a relatively large head 32m which rests and turns on the top of the groove-containing portions of the rim receiving element. Because of this, the three-can packs become a bit more difficult to stack than the four-can units, however, the thickness of the head 32m in relation to the width of the complete pack is such as to minimize any unstable relation. The head is diametrically slotted of 40m much in the manner of a screw head to receive a simple cam-operating tool such as a coin.

The shank 52 of the cam latch extends downwardly through the central opening 22m and is free to rotate therein. As shown, this shank is solid with the cam-lugs projecting radially from the base thereof across a portion of the grooves 20m. The portions 38m at the base of the shank which separate the cam-surfaces 44m conform generally with the edges of the central opening 22m and enable the latch element 14m to be passed through in the rotarial position it occupies when in released position and assembled to the rim-receiving element.

The cam-surfaces 44m are preferably simplified over those of the four-can unit to eliminate the stop-forming trailing edge 46 which, due to space limitations, is not quite as effective for the purpose intended although it can be used. No difficulty, however, is experienced in achieving or maintaining the latched position of the assembly even in the absence of a stop. Of course, one cam surface is provided for each can to be secured in the holder as was the case with the four-can unit although not specifically mentioned. Due to the lesser number of cans, a one-sixth turn of the cam-latch is required between locked and unlocked positions.

Briefly with reference to FIGURES 1 and 8, it will be obvious that multiples of either of the basic three and four-can units can be made quite simply. For instance, by joining together two four-can units at their points, a six-can unit results which is attractive and has the advantages of providing two spaced finger holds for the thumb and forefinger.

Having thus described the novel and useful features of the can holder of the present invention in connection with the accompanying drawings, it will be apparent that the many worthwhile objectives for which it was developed have been realized. Although but two specific embodiments of the invention have been illustrated herein, I realize that certain changes and modifications therein may well occur to those skilled in the art within the broad teaching found herein; hence, it is my intention that the scope of protection afforded hereby shall be limited only insofar as said limitations are expressly set forth in the appended claims.

What is claimed is:

1. A clamp-type holder for use in releasably interlocking two or more substantially identical cylindrical rimmed cans together in assembled relation which comprises, a rim-engaging element having the underside thereof provided with at least three non-intersecting concave circular grooves of the same radius that merge into one another at their extremities defining points of tangency therebetween which cooperate to locate the corners of a regular polygon having sides equal in length to the diameter of the can rims, each of said grooves being of a width and depth adapted to receive a segment of the can rim and restrain same against lateral movement, a latch element carried by the rim-engaging element for rotational movement relative thereto about an axis passing through the center of the polygon and essentially normal to the plane thereof, and a lug corresponding to each rim-receiving groove projecting from the latch element and arranged in equi-angularly spaced relation around the periphery thereof, each of said lugs including a cam surface positioned and adapted to engage the cylindrical wall of a can whose rim is located within the groove and releasably lock into position underneath the latter upon rotational movement of the latch element from an unlocked position uncovering said groove to a latched position partially covering same, and said lugs upon rotational movement of the latch element from latched to unlocked position being adapted to uncover the groove and release the can rim for removal therefrom.

2. The clamp-type rimmed can holder as set forth in claim 1 in which stop-forming means is carried by the rim-receiving element in position to engage at least one of the lugs upon movement thereof from latched into unlocked position.

3. The clamp-type rimmed can holder as set forth in claim 1 in which the cam surface of at least one lug is formed to provide stop-forming means positioned and adapted to engage the cylindrical surface of a can whose rim is located within the corresponding groove and prevent movement of the latch element past its latched position.

4. The clamp-type rimmed can holder as set forth in claim 1 in which the rim-receiving element includes a central opening of a size and shape adapted to receive the latch element with the lugs thereof rotated into unlocked position.

5. The clamp-type rimmed can holder as set forth in claim 1 in which the lugs in the latched position of the latch element lie on radial lines defined by the center of the polygon and the centers of each of the rim-receiving grooves.

6. The clamp-type rimmed can holder as set forth in claim 1 in which the lugs in the unlocked position of the latch element lie on radial lines defined by the center of the polygon and the points of tangency of each pair of adjacent rim-receiving grooves.

7. The clamp-type rimmed can holder as set forth in claim 1 in which the rim-receiving element includes centrally-located means adapted to support the latch means for rotation therein in recessed position, said means comprising a recessed ring connected to the remaining portion of said rim-receiving element by at least three equi-angularly spaced webs extending radially from said ring toward the point of tangency of each pair of adjacent grooves.

8. The clamp-type rimmed can holder as set forth in claim 7 in which the latch element includes a central opening sized to form a fingerhold and located to register with the opening in the ring in the latch-supporting means of the rim-receiving element.

References Cited in the file of this patent
UNITED STATES PATENTS

| | | |
|---|---|---|
| 1,878,579 | Gober | Sept. 20, 1932 |
| 2,197,389 | Vannucci | Apr. 16, 1940 |
| 2,810,171 | Brooks et al. | Oct. 22, 1957 |
| 2,815,855 | Fisher | Dec. 10, 1957 |
| 2,816,155 | Barnes | Dec. 10, 1957 |
| 2,876,896 | Ziehmer | Mar. 10, 1959 |
| 3,038,599 | Poupitch | June 12, 1962 |

FOREIGN PATENTS

| | | |
|---|---|---|
| 323,440 | Great Britain | Jan. 2, 1930 |